BOWLING PIN STORAGE AND DELIVERY MECHANISM

Filed May 18, 1962 9 Sheets-Sheet 1

INVENTORS
HENRY C. CONGELLI
GORDON W. HAYS
HAROLD A. JONES
ROY E. BLEWITT, JR.
BY
[signature]
ATTORNEY

BOWLING PIN STORAGE AND DELIVERY MECHANISM

Filed May 18, 1962 9 Sheets-Sheet 2

INVENTORS
HENRY C. CONGELLI
GORDON W. HAYS
HAROLD A. JONES
BY ROY E. BLEWITT, JR.
Wentworth G. Clapham
ATTORNEY

BOWLING PIN STORAGE AND DELIVERY MECHANISM

Filed May 18, 1962 9 Sheets-Sheet 3

INVENTORS
HENRY C. CONGELLI
GORDON W. HAYS
HAROLD A. JONES
ROY E. BLEWITT, JR.
BY
ATTORNEY

BOWLING PIN STORAGE AND DELIVERY MECHANISM

Filed May 18, 1962 9 Sheets-Sheet 4

INVENTORS
HENRY C. CONGELLI
GORDON W. HAYS
HAROLD A. JONES
ROY E. BLEWITT, JR.
BY
Wentworth B. Clapham
ATTORNEY INVENTORS
HENRY C. CONGELLI
GORDON W. HAYS
HAROLD A. JONES
ROY E. BLEWITT, JR.
BY Wentworth B. Clapham
ATTORNEY Oct. 5, 1965 H. C. CONGELLI ETAL 3,210,078

BOWLING PIN STORAGE AND DELIVERY MECHANISM

Filed May 18, 1962 9 Sheets-Sheet 6

INVENTORS
HENRY C. CONGELLI
GORDON W. HAYS
HAROLD A. JONES
ROY E. BLEWITT, JR.
BY
ATTORNEY

Oct. 5, 1965 H. C. CONGELLI ETAL 3,210,078

BOWLING PIN STORAGE AND DELIVERY MECHANISM

Filed May 18, 1962 9 Sheets-Sheet 7

INVENTORS
HENRY C. CONGELLI
GORDON W. HAYS
HAROLD A. JONES
ROY E. BLEWITT, JR.
BY
Wentworth B. Clapham
ATTORNEY

BOWLING PIN STORAGE AND DELIVERY MECHANISM

Filed May 18, 1962 9 Sheets-Sheet 8

INVENTOR.
HENRY C. CONGELLI
GORDON W. HAYS
HAROLD A. JONES
ROY E. BLEWITT, JR.
BY
ATTORNEY

INVENTOR.
HENRY C. CONGELLI
GORDON W. HAYS
HAROLD A. JONES
ROY E. BLEWITT, JR.
BY
Wentworth B. Clapham
ATTORNEY United States Patent Office 3,210,078
Patented Oct. 5, 1965

3,210,078

BOWLING PIN STORAGE AND DELIVERY MECHANISM

Henry C. Congelli, Stamford, Gordon W. Hays, Springdale, Harold A. Jones, Westport, and Roy E. Blewitt, Jr., Southport, Conn., assignors to American Machine & Foundry Company, a corporation of New Jersey Filed May 18, 1962, Ser. No. 195,923
18 Claims. (Cl. 273—43)

This invention relates to a bowling pin spotting machine and more particularly to the distribution and storage of pins and their delivery to the spotting and respotting devices.

In the interest of permitting a game to be played as swiftly and without delay as desired, it generally is an object in the art to develop machines which can rapidly spot and respot bowling pins on an alley. In known machines pins are circulated through a cycle of handling including their placement on the pin deck, elevation from the pit following bowling and redistribution to the pinspotting devices as a game proceeds from frame to frame. In general it is desirable that a machine operate in such manner that a maximum number of pins can be used in circulation, and thereby enable it to meet all conditions which may be placed upon it in the course of bowling play. For example, during the rolling of a first ball, and then of a second ball against pins left standing, adequate time usually is provided to allow redistribution to the pinspotting devices of pins used in the previous frame. Even if a strike is rolled, a full set of pins may have been dedistributed in sufficient time so that a delay will not be imposed in the cycle of machine operation and such devices will be able to spot these pins on the alley shortly after the strike ball. However, when successive strikes are rolled, keeping the pinspotting devices supplied with pins in pace with the rate of bowling possibly poses a difficult problem. In some instances, as when a foul is made on the first ball of a frame, it is desired to condition the machine purposely for repetitive strike cycles of operation; that is, to effect the spotting of a complete set of pins after the rolling of every ball even though the rolling of a second ball against pins remaining standing normally would be in order according to regulation play.

It is the main object of the invention to provide a machine in which the problem of always maintaining a supply of pins in readiness for transfer to the spotting means is overcome and the speed of operation of the machine is thereby increased. In accordance with the invention, pins delivered from the pit of the alley are distributed to a storage section from which, in turn, pins are transferred to the spotting means when needed. In the novel arrangement disclosed, means are provided which define the plurality of pin compartments or pockets and means in the form of rotatable semicircular members are provided for the transfer of pins to the spotting means. In this arrangement specifically, the storage section has a full capacity of two complete sets of pins, and in effect acts as a reservoir assuring constant availability of pins despite even the demand for repetitive strike cycles of operation.

Further objects and advantages will become apparent from the following description when read in conjunction with the accompanying drawings in which.

Figure 11A:
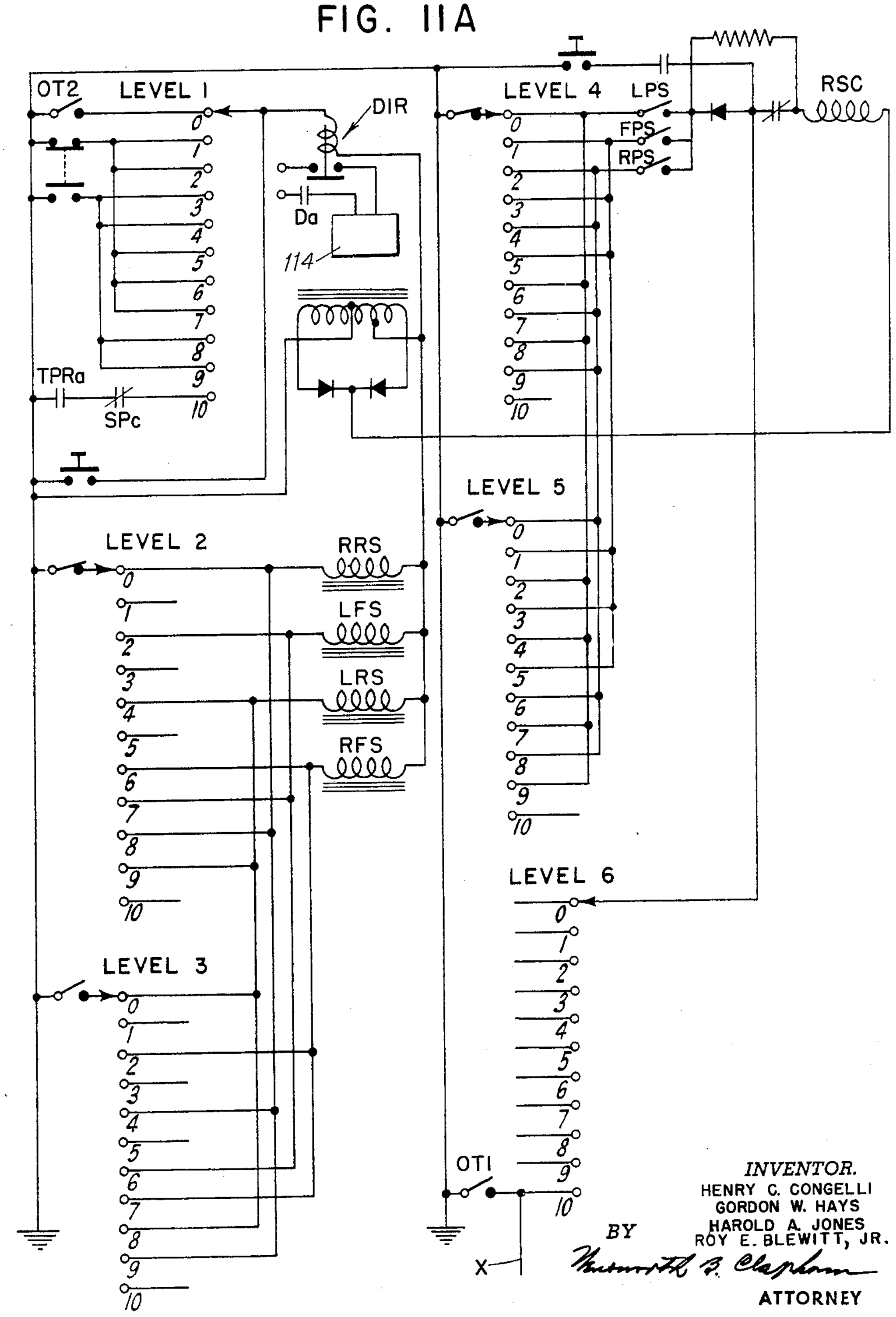
Figure 11B:
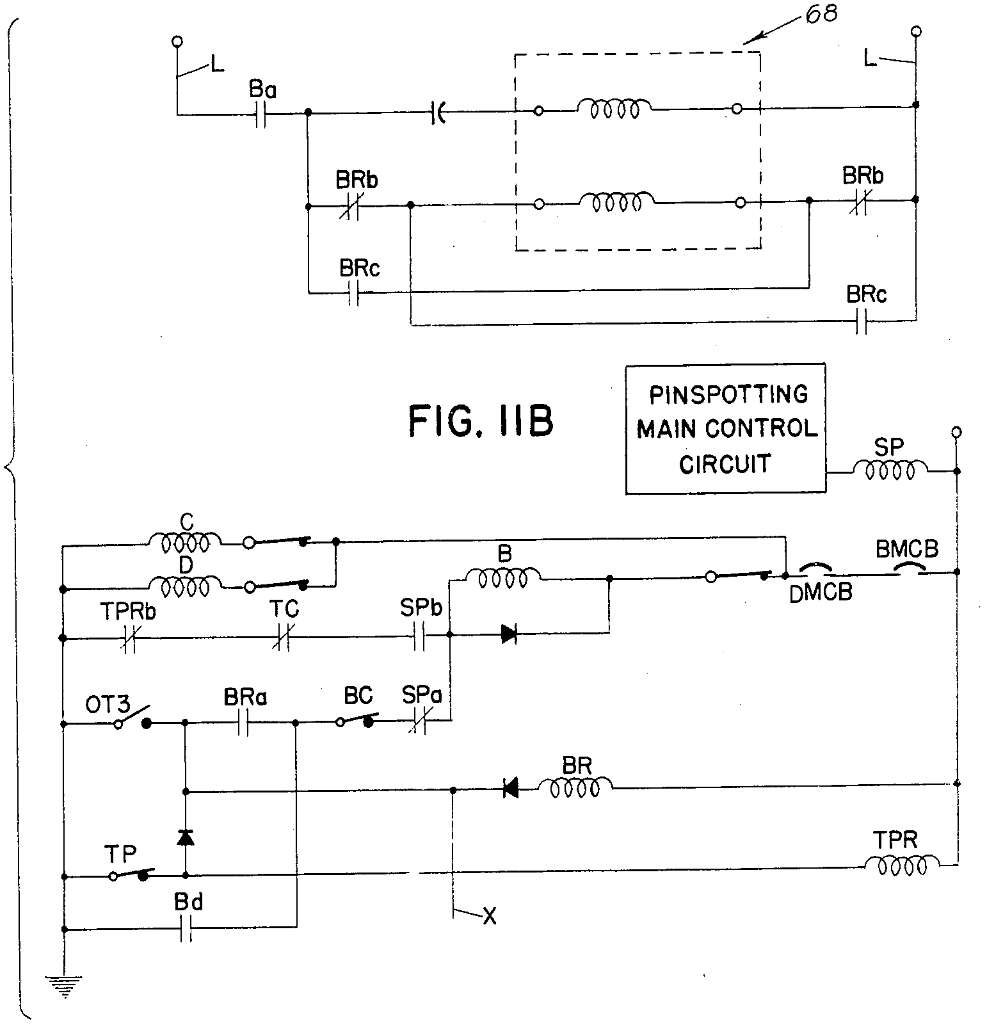
Figure 12:
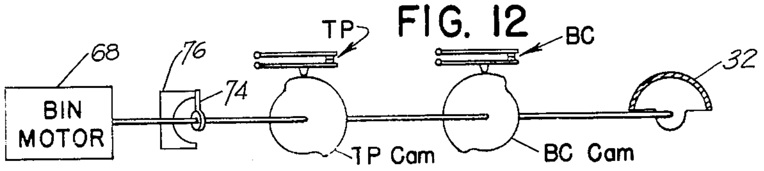
Figure 13:
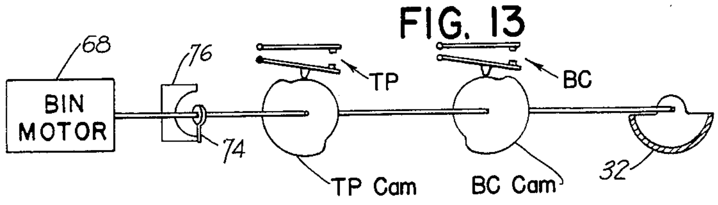

FIGURES 11A and 11B together represent a diagram of the electrical circuit for control of the machine; and FIGURES 12 and 13 schematically illustrate the operation of switch actuating cams associated with a particular pin storage section.

Figure 1:
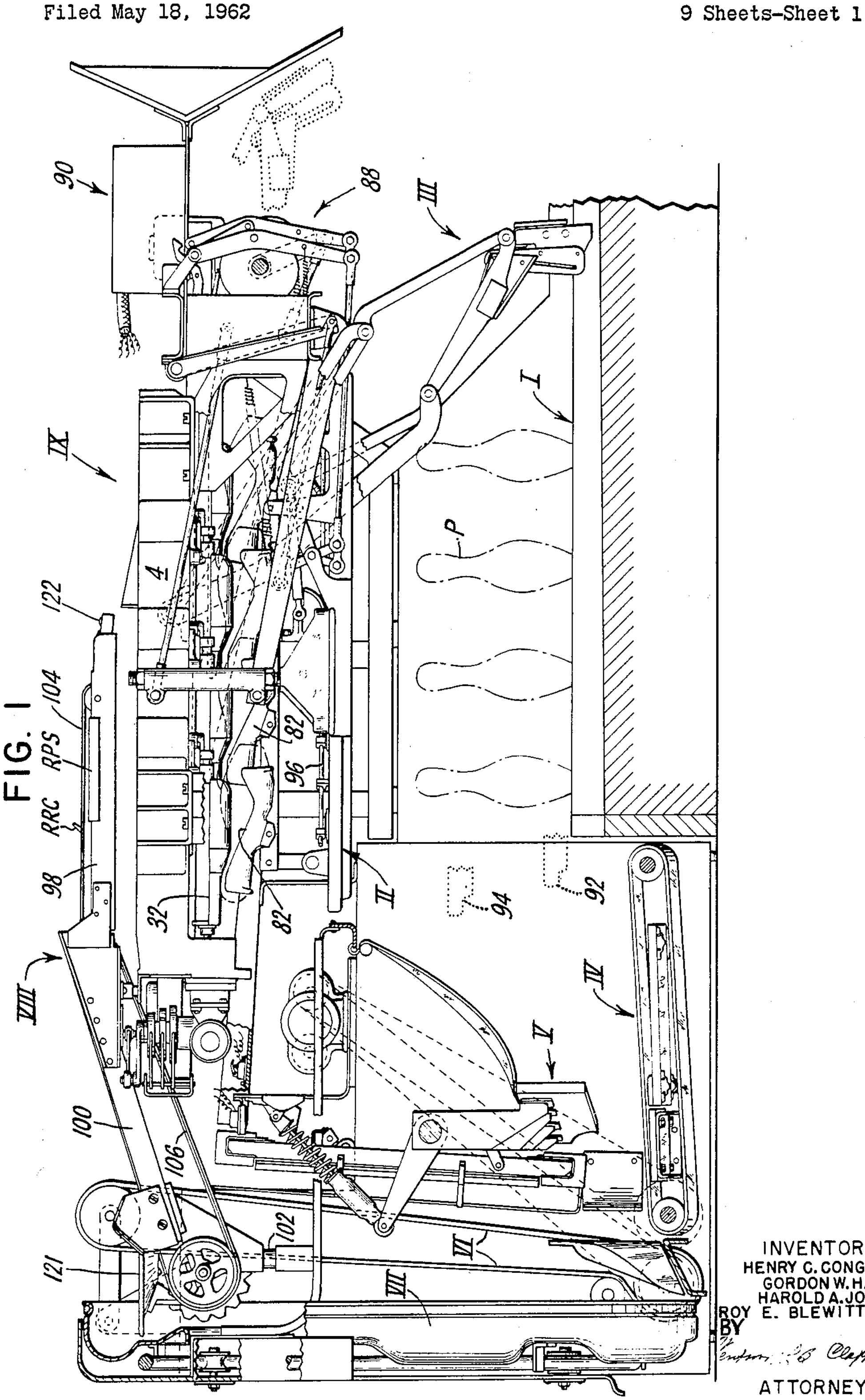
FIGURE 1 is a side elevation of a complete pin spotting machine embodying bowling pin storage and delivery mechanism constructed in accordance with the invention.

The pin storage and delivery mechanism in accordance with the invention will be described in its application to that particular pin spotting machine which is shown in FIGURE 1, although it will be understood that such mechanism is equally adaptable to other types. Referring to FIGURE 1, the pin deck I of the bowling alley has placed thereon a regulation array of ten pins P by spotting and respotting devices mounted on a table generally indicated at II. These devices form the subject matter of the copending application of Henry C. Congelli and Gordon W. Hays, Serial No. 195,926, entitled "Bowling Spotting and Respotting Mechanism" and filed May 18, 1962, to which reference can be made for a detailed description thereof. A sweep mechanism III is operative to remove to a pit conveyor IV the pins which are knocked down or which remain standing after each frame. A ball rolled down the alley strikes a backstop V, and is lifted to a ball return runway by a conveyor VI. Pins are delivered by the pit conveyor IV to a circular pin elevator VII which is the subject matter of the copending application of James D. Elliott, Serial No. 169,225, entitled "Bowling Pin Elevating Mechanism" and filed January 29, 1962. The elevator VII delivers the pins to pin distributing mechanism VIII which is the subject matter of the copending application of Roy E. Blewitt, Jr., and James D. Elliott, Serial No. 195,928, entitled "Bowling Pin Distributing Mechanism" and filed May 18, 1962. This distributing mechanism distributes the pins in a predetermined sequence to the pin storage section IX which is the main subject matter of the present application.

The storage section IX is supported by a stationary framework 2 at a location directly beneath distributor VIII and directly above spotting table II when the same is in its uppermost position. The housing of the storage section comprises a main metal casting having upstanding forward walls 4, a straight rear wall 6, and a further rearward wall 8. Dependent from the walls 6 and 8 are mutually spaced extensions 10 for housing a gear train described hereafter. This casting also provides a horizontal platform 12 having therein a plurality of oblong openings 14 arranged in a staggered triangular pattern. Beneath platform 12 the casting has stiffening transverse ribs 16 and lengthwise ribs 18. The main casting has four horizontally extending legs or mounts 20 for the purpose of mounting it on the framework 2.

Figure 2:
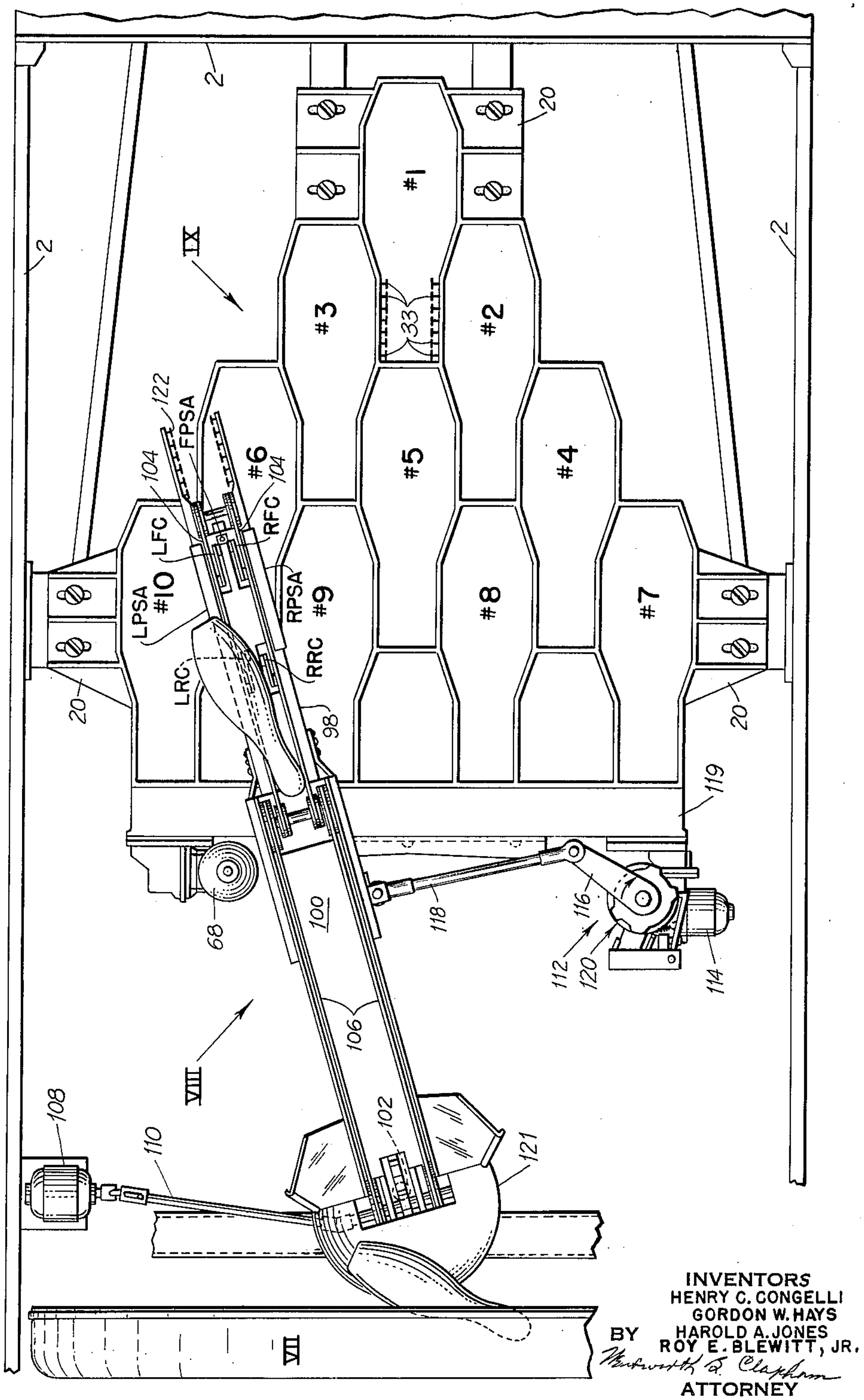
FIGURE 2 is a partial plan view of the complete machine, illustrating the pin distributing apparatus in relation to the schematically shown pin storage section.
Figure 3:
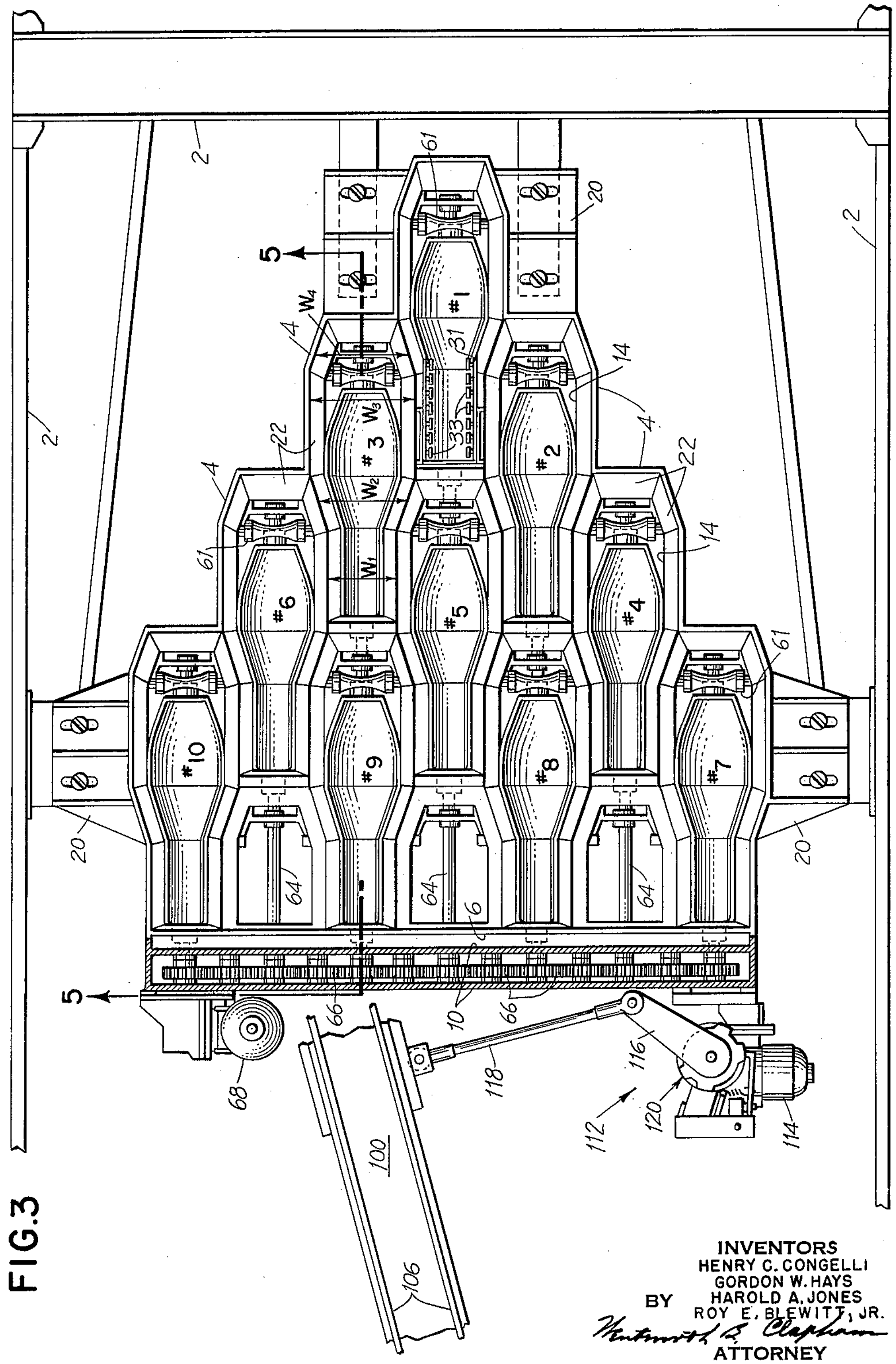
FIGURE 3 is a partial plan view of the complete machine, illustrating in detail the pin storage section.

As shown in FIGURES 2 and 3, the bin section comprises means defining ten sections, bins, compartments or pockets, which will be referred to hereafter as "bin pockets," as indicated at #1 through #10 in correspondence with the regulation array of pins. The dividing of the storage section into individual bin pockets may be accomplished by various types of partitions integrated with the main storage section housing, though in accordance with the invention described herein ten individual receptacles 22 are assembled in nested relation for this purpose. Each receptacle 22 can be cast or otherwise formed from a single piece of material or constructed in pieces; it can be formed of various materials also. However, each receptacle 22 comprises an integral unit of molded or cast plastic in accordance with the preferred embodiment of the invention disclosed herein. Each receptacle 22 is bottomless and comprises in essence an endless upstanding partition or wall, with the forward end 24 thereof sloping inwardly and downwardly to guide a pin P centrally into the bin pocket. The upper edges of adjacent receptacles 22 merge smoothly with each other as evident, for example, from the relationship of the forward end 24 of the #9 bin pocket receptacle 22 and the rearward end 26 of the #3 bin pocket receptacle 22. Adjacent receptacles also merge smoothly at their upper side portions 28. At their lower edges the receptacles 22 have an outwardly directed flange 38 which engages the supporting platform 12.

Referring particularly to FIGURE 3, it will be evident that in plan view each receptacle 22 approximates the silhouette of a regulation bowling tenpin (although it will be understood that this scheme is equally applicable to machines used in duckpin or candlepin bowling). Specifically, the receptacle 22 has a narrow rearward width $W_1$, tapering at $W_2$ into a wider portion $W_3$, which in turn tapers at $W_4$. In this arrangement the narrow portion $W_1$ finds space between the wider portion $W_3$ of adjacent receptacles 22 located rearwardly thereof.

Figure 4:
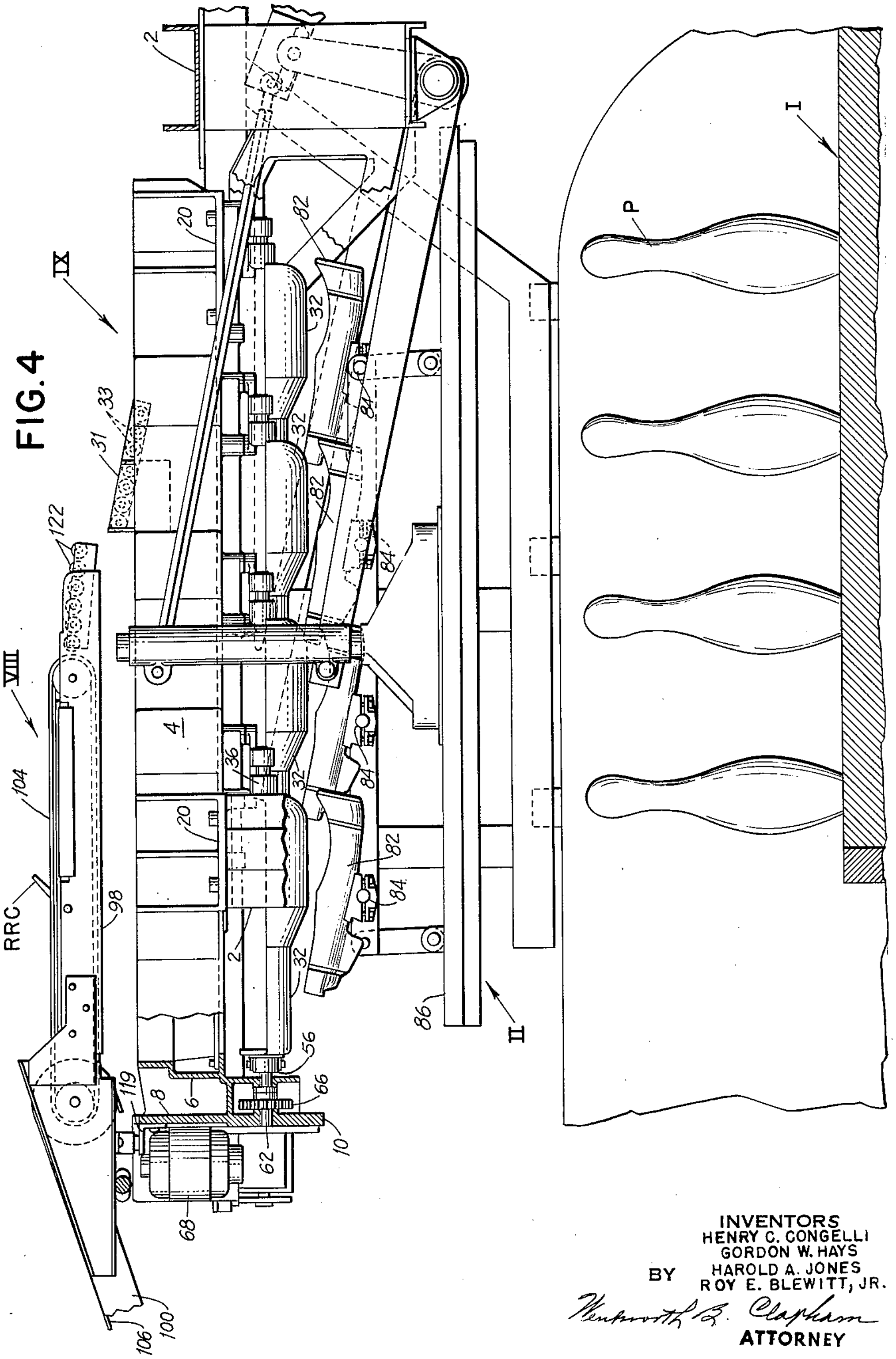
FIGURE 4 is a side elevation of the structure shown in FIGURE 3.

For reasons more related to operation of the distributor VIII, the #1 pin receptacle 22 is provided at its rearward portion with opposed members 31 which carry rollers 33 arranged in a downwardly sloping path (FIGURE 4).

Immediately below each bottomless receptacle 22, i.e. below the oblong opening 14, there is provided a bin cup 32 having a semicircular cross-section and an axial section roughly simulating that of a bowling pin. Each bin cup 32 has a mounting in the nature of a trunnion, whereby the bin cup is rotatable 180° about an axis 34 which is in approximate alignment with the lengthwise axis of a bowling pin P cradled by the bin cup. Included in the trunnion mounting means is a collar 36 at the wider end of the bin cup 32, in which collar there is keyed a pivot shaft 38. Shaft 38 is retained in the collar 36 by a snapring 40, and is journalled in a bearing 42 provided by a bracket casting. This casting has a first pair of integral arms 44 which are secured by bolts 48 to mounts 46 depending from the housing main casting. The bearing portion 42 is supported by a further pair of integrally cast arms 50 which are secured by bolts 54 to similar mounts 52. Bin guide rollers 61 having reduced middle diameters have their end pivots freely mounted in the arms 50.

The opposite end of each bin cup 32 has a collar 56 in which a further pivot shaft is fixed by means of a pin 58 enclosed by a resilient sleeve 60. In the case of any of the bin cups 32 associated with the #1, #2 and #3 bin pockets, a shaft 38 connects the rearward collar 56 to the forward collar 36 of the bin cup associated with a rearwardly located bin pocket. In the case of the bin cups 32 associated with the #7, #8, #9 and #10 bin pockets, the rearward collar 56 is keyed to a shaft 62 which is driven through a gear train 66, and in the case of the bin cups 32 associated with the #4, #5 and #6 bin pockets similar but longer shafts 64 are used as a connection to the gear train 66.

Included in gear train 66, between each gear affixed to and driving the several cup drive shafts 62 and 64, is an idler gear serving to transmit driving power and reverse rotations to the bin cups, whereby they are made to rotate in the same direction. Between the extended shaft 72 driving #10 cup and the shaft 64 driving #6 cup, there is meshed a drive gear 70. Drive gear 70 is affixed to the output shaft 67 of the integral gear reduction of motor 68. Rotation of shaft 72, and consequently the rotation of motor 68, gear train 66 and bin cups 32, is limited by means of an arm 74 fixed on the shaft 72 and a stationary plate providing abutment stops at 76. Also fixed on the shaft 72 are a "BC Cam" and "TP Cam." These cams operate a pair of switches BC and TP through associated cam follower elements 78 and 80, respectively, in a particular manner to be described hereafter.

Directly beneath each of the bin cups 32, the table structure 86 carries pinspotting cups 82 which are pivotally mounted at 84. Briefly, the function of the spotting cups 82, which are operated in unison, is to place pins at their assigned spots on the alley I. The entire arrangement of devices associated with the spotting table II is described in said copending application of Henry C. Congelli and Gordon W. Hays, Serial No. 195,926 filed May 18, 1962, and entitled "Bowling Spotting and Respotting Mechanism," to which reference may be made. Through means of cams located at 88 and electrical controls principally located at 90, in the course of spotting pins on the alley the table 86 is caused to move to a lowermost position 92, accompanied by concurrent operation of the pinspotting cups 82, and thereafter to withdraw upwardly. Following bowling of the first ball the table is lowered to a position indicated at 94 and respotting means, indicated at 96, effect the grasping and lifting of pins that remain standing, followed by respotting of these pins after the sweep III has removed fallen pins from the alley.

Figure 5:
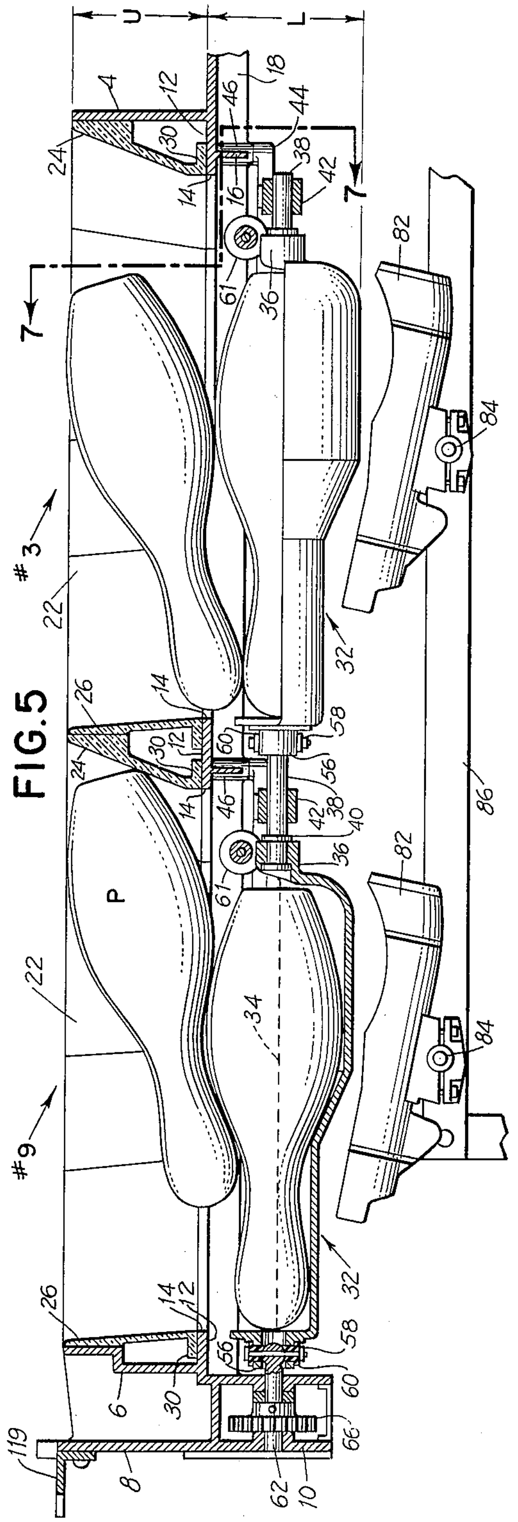
FIGURE 5 is a vertical section through the pin storage section taken as indicated by lines 5—5 in FIGURE 6.
Figure 6:
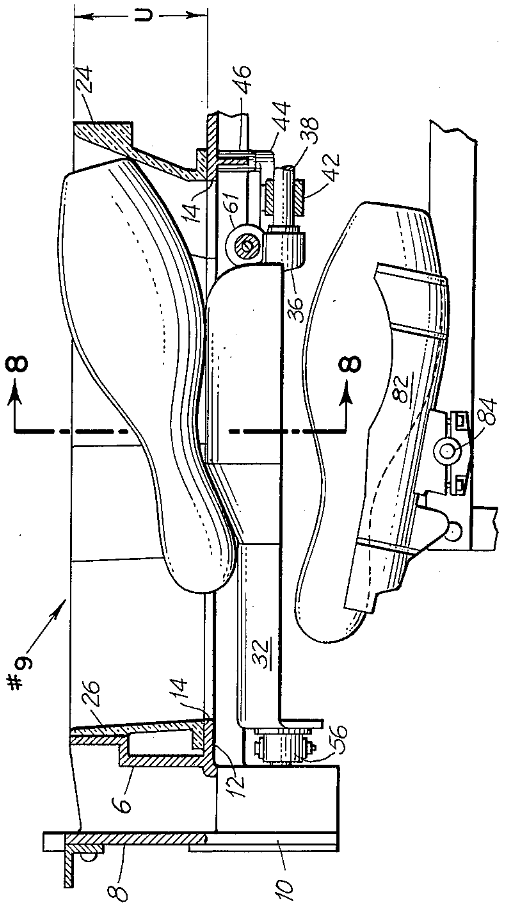
FIGURE 6 is a view similar to FIGURE 5 and illustrating the condition of the bin cups when they have been driven to an inverted position.
Figure 7:
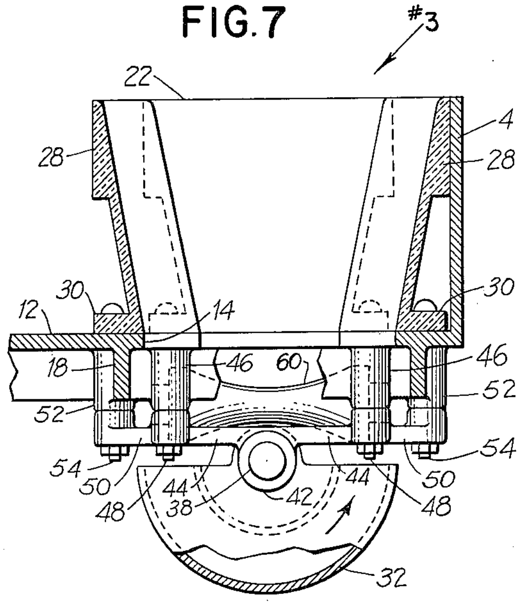
FIGURE 7 is a transverse vertical section taken as indicated by lines 7—7 in FIGURE 5.
Figure 8:
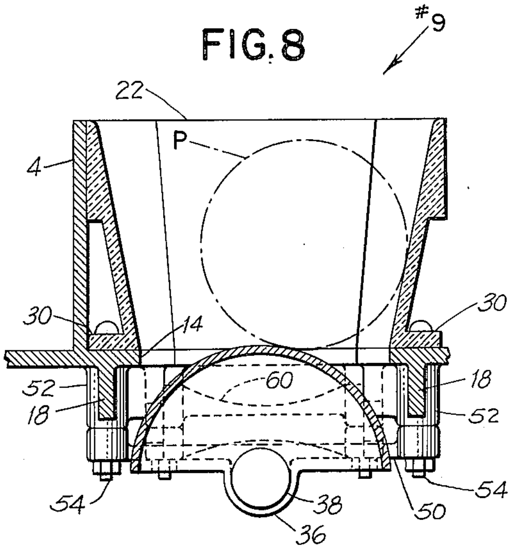
FIGURE 8 is a transverse vertical section taken as indicated by lines 8—8 in FIGURE 6.
Figure 9:
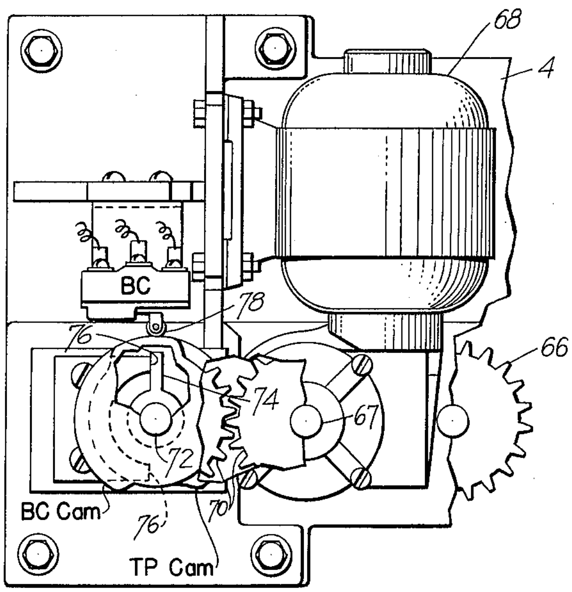
FIGURE 9 is a side view of the motorized unit for driving the cups of the pin storage section.
Figure 10:
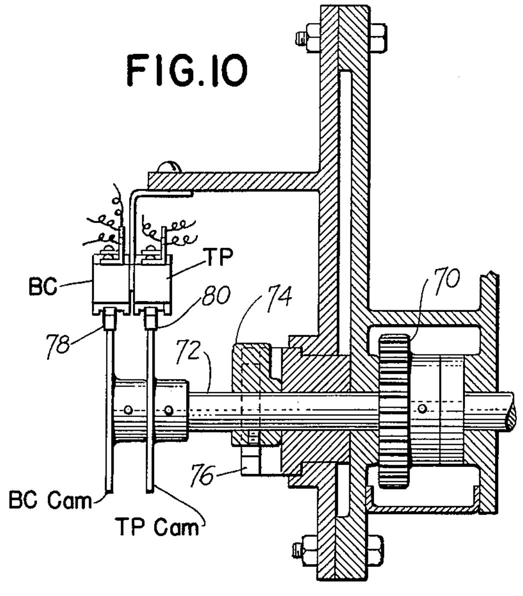
FIGURE 10 is an end view of the unit shown in FIGURE 9.

As particularly evident in FIGURES 5 and 6, when the table II is in its uppermost position the spotting cups 82 are positioned in closely spaced relation to the bin cups 32, so that as the bin cups rotate (about axes 34) from an upright position (FIGURE 5) to an inverted or upside-down position (FIGURE 6), each pin drops only a short distance in being transferred to a spotting cup 82. This, of course, is desirable from the standpoint of minimizing noise and reducing wear on the machine parts and pins. However, in view of this proximity between bin cups 32 and spotting cups 82, it is preferred that the machine control means (described hereafter) does not effect rotation of the bin cups from an inverted to an upright position—following transfer of pins to the spotting cups—until the spotting table has moved downwardly and out of the path of the bin cups 32.

The storage section IX is arranged on the basis of storage for two superposed levels of pins, although it should be understood that merely by increasing the height of the receptacles 22 the number of storage levels may be increased. In general, a storage section having a two-level capacity is quite satisfactory, and there is the advantage that the maximum distance through which a pin must drop in transfer to the bin pockets is not appreciable. An upper and a lower level are identified, respectively, as U and L in FIGURES 5 and 6. The upper level U for pin storage is provided principally by the walls of the receptacles 22. The lower level L is afforded when the cups are in their upright position (FIGURE 5), this lower level of pins being transferred to the spotting cups 82 when the bin cups 32 are driven to an upside-down or inverted position. Upon return of the bin cups 32 to an upright position, pins in an upper level U are transferred to the lower level L represented by bin cups 32. If, upon such return movement, a pin is not present in any bin pocket the bin cup 32 can receive a pin directly from the distributor VIII. In this respect it may be noted that the assembly of bin cups 32 alone, i.e., without the receptacles 22, may in itself constitute a storage section or receiver in which pins are accumulated and stored for transfer to the spotting cups 82 or to other pinspotting instrumentalities.

The distributor VIII will be described only insofar as necessary to an understanding of certain aspects of operation involving the storage section IX. The specific distributor VIII is described in said copending application of Roy E. Blewitt, Jr., and James D. Elliott, Serial No. 195,928, filed May 18, 1962, and entitled "Bowling Pin Distributing Mechanism." Furthermore, the handling, storage and transfer of pins in accordance with the present invention is not limited in scope to the use of any particular means for delivery of pins. For example, there be used a distributor of the type shown in the copending application of Henry C. Congelli, Gordon W. Hays and Charles E. Schon, Serial No. 195,921, filed May 18, 1962, and entitled "Pin Distributing Apparatus."

Distributor VIII is in the form of a swinging boom or arm comprising rigidly united forward and rear sections 98 and 100, respectively, with the swinging movement transversely across the bin pockets #1 through #10 being about a pivot 102. Belt conveyors 104 and 106 deliver pins from the rearward receiving end of the distributor and toward the other free end thereof, and are driven by a motor 108 through a drive shaft 110. The distributor has four cams designated LRC, RRC, LFC and RFC which are adapted to be raised by means of corresponding solenoids designated LRS, RRS, LFS and RFS (FIGURE 11A). If either of the cams RRC and RFC at the right side of the distributor is raised a pin will be cammed forward and off the opposite left side of the distributor, and if either of the cams LRC and LFC at the left side of the distributor is raised a pin will be cammed toward and off the right side of the distributor. By raising one of the forwardly located cams, LFC or RFC, a pin can be cammed to one of the #4, #5 and #6 bin pockets in the third row of pins, and by raising one of the rearwardly located cams, LRC or RRC, a pin can be cammed to one of the #7, #8, #9 and #10 bin pockets in the fourth row of pins. If none of the aforementioned cams is raised by its associated solenoid, pins will be permitted to proceed toward and off the end of the distributor and into either the #1, #2 or #3 bin pocket. For guiding pins thereby delivered from the end of the distributor, opposite rows of rollers 122 are provided at its end.

To signal the movement of pins from the distributor, pin switches LPS and RPS are provided at the left and right sides of the distributor, respectively, and these switches are operated by actuators designated LPSA and RPSA. To signal the movement of pins off the end of the distributor, the front pin switch FPS is operated by an actuator FPSA. An actuator is depressed by a passing pin to close one of the respective switches LPS, RPS and FPS (FIGURE 11A).

The operation of the cams LRC, RRC, LFC and RFC is coordinated with the transverse indexing of the distributor to various positions in relation to the storage section IX. This indexing is accomplished by a unit generally indicated at 112. The prime mover for the indexing unit 112 is an electric motor 114, the output drive shaft of which has a crank arm arm 116 that is connected to the distributor by a link 118, whereby continuous operation of the motor 114 would result in harmonic oscillation of the distributor. However, indexing of the distributor is intermittent, as determined by control means including switch-actuating cams 120 driven from motor 114. Various phases of the control means will be treated briefly hereafter.

The actual delivery of pins from the pit of the alley to the distributor is preformed by the pin elevator VII, which at the top of its travel drops the pins into a hopper 121 associated with the delivery end of the distributor.

The electrical controls for operation of the bin cups 32 in conjunction with operation of the other machine components will now be described with reference additionally to FIGURES 11A, 11B, 12 and 13. It is explained preliminarily that, in the interest of simplified description, certain relay contacts are shown as disassociated from their operating coils, with the contacts being schematically represented by parallel lines. In accordance with the nomenclature adopted to interrelate the contacts and coils of the relays, a spotting relay, for example, has its coil represented at SP and its switch contacts represented at SP*a*, SP*b* and SP*c*. The contacts SP*b* are closed and the contacts SP*a* and SP*c* are opened in response to energization of the relay coil represented at SP.

The motor 68 for driving the bin cups 32 through gear train 66 is reversible, as conventionally illustrated in FIGURE 11B. The direction of rotation of the bin motor upon activation is determined by switches BR*b* and BR*c*. When the relay coil BR is de-energized the motor will run in its forward direction, but when relay coil BR is energized the contacts BR*b* will be opened and contacts BR*c* will be closed to effect the running of motor 68 in a reverse direction. As explained hereafter, the forward motion of the motor is employed to drive the bin cups 32 32 from an upright, pin-cradling position to an upside-down or inverted position, thereby to transfer pins to the pin spotting cups 82. The reverse operation of the motor is employed to return the bin cups 32 from an inverted to an upright condition.

Referring to FIGURES 12 and 13, in these figures the TP Cam, BC Cam, bin cups 32 and motion-limiting arm 74 are schematically shown as being coupled to the output of bin motor 68. During reverse operation of the bin motor to return the bin cups to an upright position, the TP and BC Cams rotate in a clockwise direction in moving from their FIGURE 12 positions to their FIGURE 13 positions. In the forward operation of bin motor 68, to drive the bin cups 32 to an inverted position, the TP and BC Cams are driven in a counter-clockwise direction in moving from their FIGURE 13 to their FIGURE 12 positions. These movements of the cams and bin cups are limited to 180° of rotation by means of the elements 74 and 76. For the present it may be noted also that when the bin cups 32 are inverted both the switches TP and BC are closed, and these switches are opened when the bin cups are in the upright pin-receiving condition. Further aspects in the operation of these switches will become apparent hereafter.

The Pinspotting Main Control Circuit is schematically represented in FIGURE 11B, which is significant for present purposes only to the extent that the relay SP is responsive thereto. This circuit constitutes the means generally provided in a pin-spotting machine for the purpose of controlling the spotting cycle of the machine, and in the present case it serves to signal a demand for the transfer of pins to the pinspotting cups prior to their operation. The presently disclosed system is particularly adapted to operate in conjunction with the control circuit shown in the copending application of Roy E. Blewitt, Jr., Serial No. 195,927, filed May 18, 1962, and entitled "Control Mechanism for Bowling Pinspotting Machine," to which reference may be made if desired. However, the relay SP can comprise a part of other types of control circuits such as, for example, the pinspotting circuit disclosed in the Roger E. Dumas Patent 2,890,886, dated June 16, 1959.

The first circuit for energizing relay B (to initiate operation of the bin motor 68) comprises switches or relay contacts TPR*b*, TC and SP*b*. Operation of the switch TC is determined by the vertical position of the spotting table II, the switch TC being closed when the table is in its upper position and opened when the table is in progress downwardly and upwardly in the course of spotting and respotting phases of machine operation. The SP*b* contacts are closed in response to a signal from the Pinspotting Main Control Circuit (mentioned hereafter) indicating the demand for transfer of pins to the spotting cups 82. A second circuit for initiating energization of the relay B comprises a distributor "overtravel" switch OT3, relay contacts BR*a* and SP*a*, and the cam-operated switch BC. It is noted that this second circuit is not operative concurrently with the first circuit due to the alternating operation of contacts SP*a* and SP*b*. The SP*a* contacts are opened and the SP*b* contacts are closed in response to a pin demand signal transmitted from the Pinspotting Main Control Circuit through relay SP. The relay B also may be held in, once energized, by holding contacts B*d* which are in series with the cam-operated switch BC and relay contacts SP*a*. Holding contacts B*d* also serve to hold in the bin reverse relay BR. (Further significance of this holding feature will be treated more fully hereafter.)

The relay B cannot be energized through the circuit including TPR*b*, TC and SP*b* when the relay coil TPR is energized (because the TPR*b* contacts will then be opened), and the cam-operated switch TP is provided for the control of this relay coil TPR. The switch TP is closed when the bin cups 32 are in the position shown in FIGURE 12, thereby to energize TPR, and therefore the relay B cannot be energized through this first circuit when the bin cups are in such position. However, at such time the relay B can be energized through the closure of overtravel switches OT3 (FIGURE 11B) and OT1 (FIGURE 11A).

The operation of the overtravel switches OT1 and OT3 and the functions of the SP and TPR relays, therefore, requires a brief description of the distributor operating circuit shown in FIGURE 11A. As previously mentioned, the operation of the distributor pin cams LRC, RRC, LFC and RFC is coordinated with operation of the distributor indexing unit 112 to effect the distribution of pins to the #1 through #10 bin pockets in a predetermined sequence. This "programming" of the distributor operation is fully described in said copending application of Blewitt et al., Serial No. 195,928, filed May 18, 1962, and will be described herein only insofar as it has a bearing on operation of the control circuit shown in FIGURE 11B.

Programming of the pin distribution sequence is controlled primarily by a six-level stepping relay shown in FIGURE 11A. Each level has steps 0 through 10, and the sliding brush contacts (indicated by arrows) operate simultaneously on corresponding steps of the levels. On successive steps, indexing of the distributor by motor 114 is controlled by a relay DIR in response to operation of Level 1. (Although the relay DIR effects intermittent operation of a motor, it optionally can operate a clutch mechanism between a constantly running motor and the intermittently driven distributor.) Also, as stepping occurs the energization of the aforementioned individual solenoids RRS, LFS, LRS and RFS is controlled in response to either Level 2 or 3 (which operate alternately). This stepping is effected by a relay stepping coil RFC in response to closure of one of the pin switches LPS, FPS and RPS by movement of a pin from one of the sides or from the end of the distributor. Starting with the relay on step 0, the distributor will move either from left to right or from right to left through five indexing positions, at each of which one or more pins will be distributed according to a predetermined selection of bin pockets. As relay stepping progresses, in response to operation of the pin switches by pins leaving the distributor, the distributor finally is indexed to a distributing position at either the far left or far right of storage section IX. The delivery of the last of the ten pins at this point occurs with the relay on step 9, and is followed by a shift to step 10. Normally, at this point the distributor is ready for travel farther toward the side of storage section IX and thence back to this last indexing position, which will be termed "overtravel" herein for the purpose of description. Energization of the distributor indexing relay DIR on step 10, however, can occur only if relay contacts TPR*a* and SP*c* are closed, and this energization of relay DIR is necessary to effect running of the distributor indexing motor 114. Contacts TPR*a* will be closed by energization of relay coil TPR when switch TP is held in closed position by virtue of the bin cups 32 being in the upside-down or inverted position as represented in FIGURE 12. The contacts SP*c* are normally closed and will be opened only when the pinspotting table II is in operation to effect placement of a new set of ten pins on the alley. Assuming, however, that the latter condition does not occur and that the bin cups 32 are in their inverted position, overtravel movement of the distributor by motor 114 will normally be initiated on step 10.

As described in said copending application of Blewitt et al., Serial No. 195,928, shortly after overtravel begins an overtravel cam on the distributor motor drive shaft closes switches OT1, OT2 and OT3. The closure of switch OT1 effects immediate stepping of the relay back to step 0, and by virtue of closure of switch OT2 the relay DIR is held in. The closure of switch OT1, secondly, effects energization of a bin relay BR through a line X leading from the circuit shown in FIGURE 11A to the circuit shown in FIGURE 11B. The energization of relay BR, as previously mentioned, conditions the bin motor 68 for operation in reverse direction to return the bin cups 32 to an upright position (FIGURE 13). The overtravel cam is contoured so that the switches OT1, OT2 and OT3 will be held closed until the distributor has substantially completed its overtravel movement and approaches its original indexing position in readiness for resumption of pin distribution to the bin pockets. Throughout such overtravel, therefore, the relay BR is held energized.

The actual initiation of reverse bin motor operation is effected by closure of contacts BR*a* following the closure of switches OT1, OT2 and OT3 at the beginning of overtravel movement. Relay B will then be energized to close contacts B*a*. Shortly after the motor 68 begins to rotate the bin cups 32 toward an upright position (in a clockwise direction in FIGURE 12) the TP switch will be opened. Switch BC, however, remains closed until the bin cups approach the fully upright position shown in FIGURE 13, whereupon switch BC will be opened to interrupt the circuit through relay B and elements 74 and 76 will halt rotation of bin cups 32 at the 180° point. This operation of the bin motor 68 normally is completed prior to the end of distributor overtravel, and although the relay B falls out the relay BR remains energized thereafter until switch OT3 is opened at the end of overtravel. Thereby an arcing condition in the bin motor is prevented. Also, despite the prior opening of switch TP, relay TPR will be held in until the opening of switch OT3 at the end of distributor overtravel. Immediately upon reversal of the bin cups to an upright position, pins will be dropped from the upper level U of the bin pockets into the lower level L provided by the bin cups. If, at that instant, the Pinspotting Main Control Circuit demands through SP the transfer of pins to the spotting cups 82, despite the closure of contacts SP*b* the relay B cannot be energized to satisfy such demand until the end of distributor overtravel, at which time the de-energization of TPR will perimt the closure of contacts TPR*b*. This aspect of the operation insures that a time delay will be imposed during which pins dropping from the upper level U to the lower level L will be permitted to fully settle prior to movement of the bin cups to an inverted position in response to demand from the Pinspotting Main Control Circuit.

Assuming that distributor overtravel has now been completed in the manner above described and that pins have been dropped to the lower level L because of reversal of the bin cups to an upright position, the distributor will proceed to distribute a second set of ten pins to the storage section IX. During this continued pin distribution, if a demand for transfer of pins from the bin cups 32 to the pin spotting cups 82 is not received from Pinspotting Main Control Circuit through relay SP, the bin cups 32 will remain in their upright position. Switch TP will then be open (FIGURE 13) and relay TPR will be de-energized to effect opening of contacts TPR*a* in step 10, Level 1, of the distributor stepping relay (FIGURE 11A). Therefore, as the distributor completes the distribution of a further set of ten pins to the bin pockets and step 10 again is reached, the distributor will not be permitted to go into overtravel in the manner aforedescribed. The open condition of contacts TPR*a* will indicate that the previously distributed set of ten pins as well as the presently distributed set of ten pins occupy two levels, U and L, of the storage section IX. As this is the capacity for which the storage section is constructed, the stepping relay in the distributor control circuit will remain temporarily inactive. If more than twenty pins have been supplied to the overall pinspotting machine, these extra pins will proceed off the end of the distributor and onto a ledge (not shown) provided for this purpose at the sides of storage section IX. It is pointed out, however, that if the distributor is constructed for a capacity of more than two levels of pins the distributor control circuit can be modified so that distributor operation will continue until full capacity of the storage section has been reached.

It should now be clear that with the bin cups 32 in their upright position, all that normally is necessary to cause their operation for the transfer of pins to spotting cups 82 is the energization of relay SP in response to demand from the Pinspotting Main Control Circuit. Upon energization of SP the contacts SP*b* will be closed to effect energization of relay B and running of the bin motor 68 in a forward direction. As the bin cups 32 are driven by the motor 68 toward an upside-down or inverted position the switch BC is first closed and then, as the bin cups approach their fully inverted position, the switch TP will close to effect energization of relay TPR. This energization of relay TPR will cause opening of contacts TPR*b* and consequent de-energization of relay B. Pins are then dropped from the bin cups 32 into the spotting cups 82.

It will be recalled from the previous description that the spotting cups 82 are positioned directly beneath the bin cups 32 in very close proximity thereto. Therefore, as evident particularly from FIGURE 6, when the bin cups are inverted to place pins in the spotting cups it would be undesirable to effect immediately the return of the bin cups to their upright position. Because the transferred pins would then be close to the bin cups, the return of the bin cups to an upright position should be delayed until the table II has moved downwardly and out of the range of bin cup movement. Otherwise, in the course of movement of the bin cups they would strike the pins cradled in the spotting cups 82. This movement of the bin cups to an upright position normally does not occur unless and until the distributor stepping relay is on step 10. It is possible, however, that the distributor would complete the distribution of a set of ten pins to the bin pockets and go into overtravel concurrently with the transfer of pins from the bin cups 32 to the pin spotting cups 82, which would result in the undesired immediate return of the bins cups to an upright position following their movement to the inverted pin-transferring position. The undesirable condition outlined above cannot occur, because it will be noted that the transfer of pins from the bin cups to the spotting cups necessitates the energization of relay SP. This causes the holding open of contacts SP*c* in step 10 of the stepping relay Level 1. The distributor then cannot proceed into its overtravel movement, for reasons above described, and the closing of overtravel switches OT1 and OT3 which would normally effect rotation of the bin cups to an upright position then cannot occur. The rotation of the bin cups to an upright position can occur only after closing of the spotting relay contacts SP*c* has permitted the distributor to proceed into its overtravel portion of indexing movement.

If, for any unusual reason, the bin cups become jammed in a position intermediate their inverted and upright positions, the completion of bin cup operation will not as usual precede completion of distributor overtravel. In such case, despite the opening of switch OT3 the contacts B*d* will prevent de-energization of the bin reverse relay BR prior to the de-energization of relay B, which occurrence would have undesirable arcing effects in the bin motor 68.

A further feature inherent in the circuit shown in FIGURE 16B involves the overload circuit breakers employed. At C there is indicated the coil of a relay which is normally energized to effect continued operation of a motor which drives the pit conveyor, pin elevator and ball return conveyor. At D there is indicated the coil of the relay which is normally energized to close the contacts D*a* in the circuit of distributor indexing motor 116. It will be noted that all of the relays C, D and B are in series with a pair of circuit breakers DMCB and BMCB. The circuit breaker DMCB is provided in the circuit associated with the power supply to the distributor motors, and therefore will open in the event of overload thereof. The circuit breaker BMCB is associated with the power supply for the bin motor, and therefore will open in the event of overload of this motor. Because the last two-mentioned circuit breakers are in series, the overload of either the distributor or the bin motor will prevent energization of the three relays C, D and B. The result will be that the entire back end of the machine will be shut down, including the motors for the distributor and the motors for the pit conveyor, pin elevator, ball return elevator and distributor. This is significant, for if a pin becomes jammed anywhere in the distributor or in the bin section, or in conjunction with both, damage to the machine will be prevented by this interruption in machine operation.

The apparatus which has been described has the significant advantages which were discussed in the introduction hereto. It will be understood that various departures from the specifically disclosed embodiment of the invention may be effected without departing from the scope thereof as defined by the following claims.

What is claimed is:

1. In a bowling pinspotting machine, the combination of devices adapted to receive a set of pins and place them on a bowling alley, apparatus for elevating pins from the pit of the alley, a pin storage assembly having a plurality of pin receiving compartments arranged in closely spaced relation above said devices and being adapted to transfer a set of pins to said devices, a pin distributing conveyor movable across said storage assembly in close proximity thereto for receiving pins from said elevating mechanism and automatically delivering them in succession to said compartments according to a predetermined scheme of distribution, said storage assembly comprising: a structure defining said compartments in a horizontally oriented triangular pattern, each of said compartments being adapted to accommodate a bowling pin lying on its side and having an open bottom and top, with said open bottom directly facing one of said devices when the device is in condition to receive a pin, and means in said compartments for effecting the transfer of pins to said devices, the last-mentioned means in each compartment comprising a member extending lengthwise within the compartment and having an upper contour adapted to cradle a pin, said member being mounted for rotation about an axis extending lengthwise thereof, and means for rotating said members in unison from an upright pin cradling condition to an inverted condition to transfer pins to their associated devices for the subsequent placement of the pins on the alley, the depth of said compartments as defined by said structure and by said members when the same are in said upright position being adequate to accommodate only two superposed levels of pins.

2. The invention according to claim 1, wherein each said member is semicircular in section normal to said axis of rotation.

3. The invention according to claim 1, wherein each said member has an axial half section interiorly simulating roughly the shape of a pin, and wherein said axis of rotation approximately coincides with the axis of a pin cradled by said member.

4. The invention according to claim 1, including means for delaying the operation of said member rotating means if every one of said compartments does not contain at least one pin.

5. The invention according to claim 4, wherein the last mentioned means is responsive to the progressive distribution of pins to said compartments, and conditions said member rotating means for operation upon completed distribution of a full set of pins.

6. The invention according to claim 5, including means responsive to rotation of said members from the upright to the inverted condition to nullify said conditioning of the member rotating means, said distribution responsive means again conditioning said member rotating means for rotation from the upright to the inverted condition only following the distribution of another complete set of pins.

7. The invention according to claim 1, wherein said member rotating means is operative to rotate said members from the inverted condition back to the upright condition after transfer of pins to said devices.

8. The invention according to claim 7, including means imposing a minimum time delay between movement of the members to the upright condition and the operation of said member rotating means to rotate the members to an inverted condition, thereby to afford ample time for settling of pins in said compartments.

9. In a bowling pinspotting machine, the combination of devices adapted to receive a set of pins and place them on a bowling alley, apparatus for elevating pins from the pit of the alley, a pin storage assembly having a plurality of pin receiving compartments arranged in closely spaced relation above said devices and being adapted to transfer a set of pins to said devices, a pin distributing conveyor movable across said storage assembly in close proximity thereto for receiving pins from said elevating mechanism and automatically delivering them in succession to said compartments according to a predetermined scheme of distribution, said storage assembly comprising: a structure defining said compartments in a horizontally oriented triangular pattern, each of said compartments being adapted to accommodate a bowling pin lying on its side and having an open bottom and top, with said open bottom directly facing one of said devices when the device is in condition to receive a pin, and means in said compartments for effecting the transfer of pins to said devices, the last-mentioned means in each compartment comprising a member extending lengthwise within the compartment and having a contour adapted to cradle a pin, a mounting of the trunnion type for each said member having aligned pivot axes coinciding approximately with the axis of a pin cradled in the member, and means for rotating said members about said pivot axes between an upright pin cradling condition and an inverted condition in which a set of pins is transferred to said devices.

10. The invention according to claim 9, wherein each said member has an axial half section interiorly simulating roughly the shape of a pin and has a substantially semicircular shape in section normal to said pivot axes.

11. The invention according to claim 9, wherein said devices comprise cup-like elements each being operable to spot a pin on the alley and means for operating said elements to effect such spotting, each of said elements having an inactive upper position in close proximity to the bottom of said compartments, and including means preventing the rotation of said members from an inverted to an upright position until said elements containing a set of pins have moved from said close proximity to said members.

12. In a bowling pinspotting machine, the combination of devices adapted to receive a set of pins and place them on a bowling alley, means controlling the operation of said devices, apparatus for elevating pins from the pit of the alley, a pin storage assembly above said devices having a plurality of pin receiving compartments and adapted to transfer a set of pins to said devices, and apparatus for receiving pins from said elevating apparatus and distributing the pins in succession to said compartments, said storage assembly comprising: a structure defining said compartments in a horizontally oriented triangular pattern, each of said compartments being adapted to accommodate a substantially horizontally positioned bowling pin and having an open bottom and top, with said open bottom facing one of said devices when the device is in condition to receive a pin, a member in each of said compartments movable from a first position to a second position to transfer a pin to a said device in receiving position therebelow, means responsive to a demand signal from said device controlling means to move said members in unison from said first to said second position and thereafter to return the members to said first position, means set by said pin distributing means in a first condition in response to completed distribution of a first set of pins to said compartments and changeable to a second condition in response to movement of said members to said second position thereof, the last mentioned means being returned to said first condition upon completed distribution of a second complete set of pins to said compartments and being interconnected with said means for moving said members to permit movement thereof from said first to said second position only when the last mentioned means is in said first condition, thereby to permit pin-transferring movements of said members only when a complete set of pins is available in said compartments.

13. In a bowling pinspotting machine, the combination of devices adapted to receive a set of pins and place them on a bowling alley, apparatus for elevating pins from the pit of the alley, a pin storage assembly above said devices having a plurality of pin receiving compartments and adapted to transfer a set of pins to said devices, and apparatus for receiving pins from said elevating apparatus and distributing the pins in succession to said compartments, said storage assembly comprising: a structure defining said compartments in a horizontally oriented triangular pattern, each of said compartments being adapted to accommodate a substantially horizontally positioned bowling pin and having an open bottom and top, with said open bottom facing one of said devices when the device is in condition to receive a pin, means for repetitively transferring complete sets of pins from said compartments to said devices, means jointly responsive to the progressive distribution of pins to said compartments and to successive operations of said pin transferring means to determine thereby the availability of sets of pins in said compartments, and means controlled by the last-mentioned means for preventing operation of said pin transferring means when a complete set of pins is not available in said compartments.

14. In a bowling pinspotting machine, a spotting and respotting table including a triangular arrangement of pinspotting cups each adapted to receive a pin delivered in a horizontal position and place the same on a bowling alley, a pin storage assembly including a structure defining a plurality of open pin receiving compartments directly above and in close proximity to the corresponding plurality of said pinspotting cups, each of said compartments being adequate to accommodate two superposed levels of pins disposed horizontally, a mechanism in each of said compartments operable to lower a pin in substantially horizontal disposition from the lower of said levels into the associated pinspotting cup directly therebelow, a pin distributing conveyor operable directly above said open compartments and in close proximity thereto, means for moving pins off said conveyor in such manner that the pins drop into said compartments while remaining in substantially horizontal disposition, and means for elevating pins from the pit of said alley for delivery to said conveyor.

15. The invention according to claim 14, wherein each said mechanism comprises a trough-shaped element rotatable on a lengthwise axis between an upright pin cradling condition and an inverted pin transferring condition, and including means delaying the rotation of said element from said inverted position to said upright position until said pinspotting cups have moved downwardly away from close proximity to said element.

16. In a bowling pinspotting machine, the combination of devices adapted to receive a set of pins and place them on a bowling alley, a pin storage assembly having a plurality of open pin receiving compartments arranged directly above and in close proximity to said devices, each of said compartments being adequate to accommodate at least two superposed levels of pins disposed horizontally, means for effecting the transfer of pins from said compartments to said devices, a pin distributing conveyor operable directly above said open compartments including means for transferring pins disposed substantially horizontally from said conveyor into said compartments in succession according to a predetermined scheme of distribution, and means for elevating pins from the pit of said alley to said conveyor.

17. The invention according to claim 16, wherein said transfer means comprises a member in each compartment extending lengthwise therein and having a contour adapted to cradle a pin, said member being mounted for rotation about an axis extending lengthwise thereof, and means for rotating said member from an upright pin cradling condition to an inverted condition to transfer a pin from the compartment to the said device directly therebelow.

18. The invention according to claim 17, wherein each said compartment has a capacity of two superposed pins when its associated pin transferring member is in said upright condition and a capacity of one pin when said member is in said inverted condition.

References Cited by the Examiner

UNITED STATES PATENTS

| | | | |
|---|---|---|---|
| 1,190,651 | 7/16 | Hedenskoog | 273—43 |
| 2,017,143 | 10/35 | Bentz | 273—43 |
| 2,310,218 | 2/43 | Davis | 273—43 |
| 2,668,713 | 2/54 | Anderson | 273—43 |
| 2,769,637 | 11/56 | Zuercher | 273—43 |
| 2,962,284 | 11/60 | Bilowz | 273—43 |
| 3,123,201 | 3/64 | Dowd et al. | 273—43 |

DELBERT B. LOWE, *Primary Examiner.*